(12) United States Patent
Hiller

(10) Patent No.: US 10,323,668 B2
(45) Date of Patent: Jun. 18, 2019

(54) PLUG CONNECTION ELEMENT AND TRANSPORTATION BOX HAVING PLUG CONNECTION ELEMENTS

(71) Applicant: Gerustverleih Hiller GmbH, Weil im Schonbuch (DE)

(72) Inventor: Axel Hiller, Weil im Schonbuch (DE)

(73) Assignee: Hiller Technologie GmbH, Weil im Schonbuch (DE)

( * ) Notice: Subject to any disclaimer, the term of this patent is extended or adjusted under 35 U.S.C. 154(b) by 362 days.

(21) Appl. No.: 15/229,454

(22) Filed: Aug. 5, 2016

(65) Prior Publication Data

US 2017/0037888 A1     Feb. 9, 2017

(30) Foreign Application Priority Data

Aug. 7, 2015   (DE) .................... 20 2015 104 154 U

(51) Int. Cl.
*F16B 5/12*       (2006.01)
*F16B 5/06*       (2006.01)
(Continued)

(52) U.S. Cl.
CPC ............... *F16B 5/121* (2013.01); *B65D 9/32* (2013.01); *B65D 9/34* (2013.01); *B65D 19/14* (2013.01); *B65D 19/16* (2013.01); *F16B 15/0053* (2013.01); *B65D 2519/00019* (2013.01); *B65D 2519/00029* (2013.01);
(Continued)

(58) Field of Classification Search
CPC ............... Y10T 403/42; Y10T 403/555; Y10T 403/4602; F16B 5/121; F16B 5/0614; B65D 9/32; B65D 9/34; B65D 19/02; B65D 19/06; B65D 19/14; B65D 2519/00223; B65D 2519/00626; B65D 2519/00636; B65D 2519/00666
See application file for complete search history.

(56) References Cited

U.S. PATENT DOCUMENTS 1,031,691 A * 7/1912 Courville ................. B65D 9/34
                                                      217/12 R
1,441,393 A * 1/1923 Benish ..................... B65D 9/34
                                                      217/69
(Continued)

FOREIGN PATENT DOCUMENTS

DE   20 2004 010 560 U1    9/2004
DE   20 2007 003 048 U1    5/2007

*Primary Examiner* — Jonathan P Masinick
(74) *Attorney, Agent, or Firm* — Renner, Otto, Boisselle & Sklar, LLP

(57) ABSTRACT

The invention relates to a plug connection element for releasable connecting two adjacent wall elements of a transportation box, having a first U-shaped receptacle for an edge region of the first wall element, which is formed from a first base plate and an inner leg angled to the latter and an adjoined angled outer leg, and a second U-shaped receptacle for an edge region of the second wall element, which is formed from a second base plate and an inner leg angled to the latter and an adjoined angled outer leg, wherein the first and second U-shaped receptacle are identically aligned, wherein the first and second receptacle are connected to each other by means of a bending joint, so that the U-shaped receptacles is adjustable in terms of their angular position to each other.

20 Claims, 4 Drawing Sheets

Figure 4:
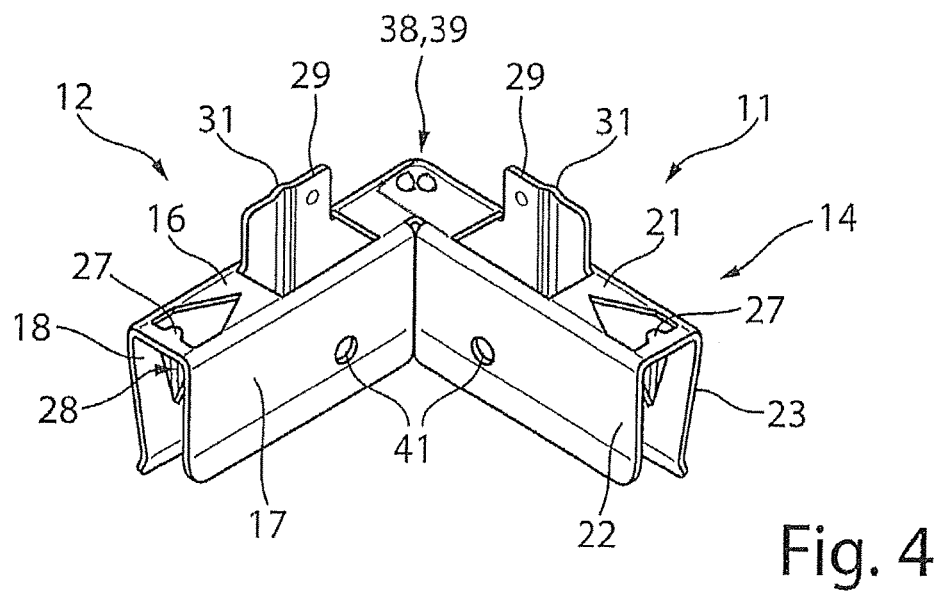

(51) Int. Cl.
   *F16B 15/00*   (2006.01)
   *B65D 19/16*   (2006.01)
   *B65D 6/34*    (2006.01)
   *B65D 6/00*    (2006.01)
   *B65D 19/14*   (2006.01)

(52) U.S. Cl.
   CPC .............. *B65D 2519/00034* (2013.01); *B65D 2519/00054* (2013.01); *B65D 2519/00064* (2013.01); *B65D 2519/00069* (2013.01); *B65D 2519/00159* (2013.01); *B65D 2519/00169* (2013.01); *B65D 2519/00174* (2013.01); *B65D 2519/00194* (2013.01); *B65D 2519/00203* (2013.01); *B65D 2519/00208* (2013.01); *B65D 2519/00273* (2013.01); *B65D 2519/00323* (2013.01); *B65D 2519/00338* (2013.01); *B65D 2519/00497* (2013.01); *B65D 2519/00502* (2013.01); *B65D 2519/00621* (2013.01); *B65D 2519/00666* (2013.01); *B65D 2519/00716* (2013.01); *F16B 5/0614* (2013.01)

(56) References Cited

U.S. PATENT DOCUMENTS

| | | | | | |
|---|---|---|---|---|---|
| 1,691,158 | A | * | 11/1928 | Lion | B65D 9/32 |
| | | | | | 217/69 |
| 2,168,911 | A | * | 8/1939 | Meyer | A47F 5/005 |
| | | | | | 217/69 |
| 2,262,730 | A | * | 11/1941 | Way | B65D 5/446 |
| | | | | | 206/451 |
| 2,717,665 | A | * | 9/1955 | Himmel | E06B 3/9644 |
| | | | | | 403/205 |
| 2,895,186 | A | * | 7/1959 | Franks | B65D 9/34 |
| | | | | | 211/188 |
| 3,724,398 | A | * | 4/1973 | Brennan | B65D 19/40 |
| | | | | | 108/55.5 |
| 4,812,075 | A | * | 3/1989 | Lavin, Sr. | A47B 96/06 |
| | | | | | 403/205 |
| 4,870,711 | A | * | 10/1989 | Felix | A47C 19/005 |
| | | | | | 5/200.1 |
| D312,783 | S | * | 12/1990 | Sharp | D9/434 |
| 5,209,597 | A | * | 5/1993 | Flaming | F16B 2/22 |
| | | | | | 229/122.21 |
| 5,259,685 | A | * | 11/1993 | Gilb | E04B 1/26 |
| | | | | | 403/170 |
| 5,431,336 | A | * | 7/1995 | Clee | B65D 5/006 |
| | | | | | 206/512 |
| 5,531,326 | A | * | 7/1996 | Hummel | B65D 5/006 |
| | | | | | 206/509 |
| 5,538,178 | A | * | 7/1996 | Zink | B65D 11/1853 |
| | | | | | 229/117.01 |
| 5,820,292 | A | * | 10/1998 | Fremstad | A47G 1/10 |
| | | | | | 403/403 |
| 6,102,498 | A | * | 8/2000 | Kohler | H02B 1/28 |
| | | | | | 312/223.1 |
| 6,547,127 | B2 | * | 4/2003 | Bradford | B65D 5/0055 |
| | | | | | 220/4.28 |
| 8,720,839 | B2 | * | 5/2014 | Lijesnic | A47B 47/0033 |
| | | | | | 248/300 |
| 9,472,903 | B2 | * | 10/2016 | Kurita | H05K 9/0035 |
| 2005/0265778 | A1 | * | 12/2005 | Tzeng | F16B 12/52 |
| | | | | | 403/231 |
| 2011/0000906 | A1 | * | 1/2011 | Wood | B65D 5/4283 |
| | | | | | 220/1.5 |
| 2015/0083873 | A1 | * | 3/2015 | Garpow | F16M 13/02 |
| | | | | | 248/205.3 |

* cited by examiner

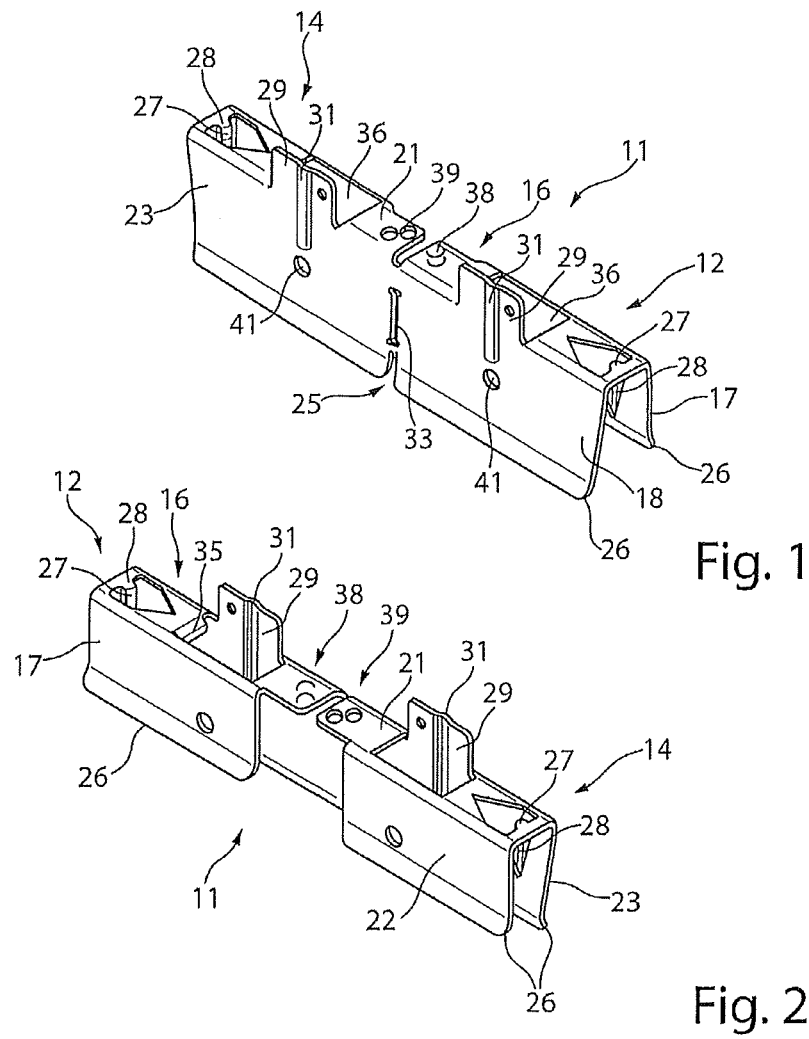
Fig. 1
Fig. 2
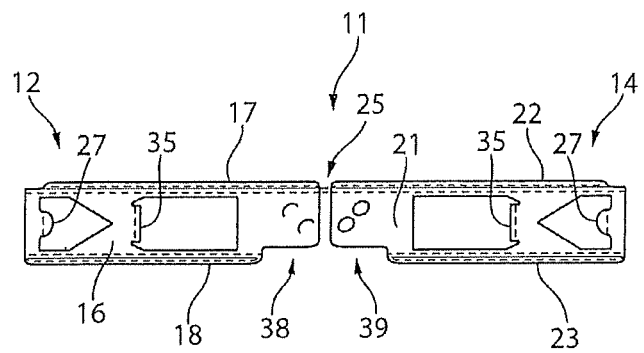
Fig. 3

PLUG CONNECTION ELEMENT AND TRANSPORTATION BOX HAVING PLUG CONNECTION ELEMENTS

This application claims priority of German Application No. 20 2015 104 154.3 filed Aug. 7, 2015, which is hereby incorporated herein by reference.

The invention relates to a plug connection element for releasable connecting two adjacent wall elements, in particular for a transportation box, and a transportation box consisting of a pallet floor, wall elements and a lid, which are connected to each other by means of such plug connection elements.

DE 20 2004 010 560 U1 discloses a plug connection element consisting of a base plate, on which a U-shaped receptacle is formed, wherein the U-shaped receptacle extends at a right angle. The U-shaped receptacle serves for the mounting of two adjacent wall elements, said wall elements being aligned perpendicular to each other. Fastening bores into which nails or bolts can be inserted are provided in the base plate for the fixing of the plug connection element.

DE 20 2007 003 048 U1 further discloses a plug connection element for releasable connection of two adjacent wall elements of a transportation box, said plug connection element having a U-shaped receptacle that extends over a corner. Here, the inner leg is formed longer than the outer leg. Between the inner and outer leg, a cutting device extends transversely to the longitudinal extension of the U-shaped receptacle, which cutting device penetrates into an outer edge of the wall element when the plug connection element is set down and thereby enables, in the horizontal direction, a fixing of the wall element to the plug connection element.

The above-mentioned plug connection elements are restricted in use exclusively to a 90° corner arrangement of wall elements.

The object of the present invention is to create a plug connection element that is flexible in use and enables various angular positions of wall elements, in particular for formation of a transportation box, and a transportation box that enables a positioning of wall elements for various geometries of transportation boxes.

This object is solved by a plug connection element, in which a first U-shaped receptacle and a second U-shaped receptacle are identically aligned and connected to each other by means of a bending joint, so that the first U-shaped receptacle and second U-shaped receptacle are changeable in their angular positions to each other or are foldable. By means of such a plug connection element it is possible to create both a corner connection element having an angle of 90° as well as a longitudinal connection element in which the first and second U-shaped receptacles are aligned at an angle of 180° to each other—i.e. in true alignment. Likewise, the first and second receptacle can be arranged at an angle in between, for example for the formation of a hexagonal or octagonal container wall of a transportation box. By virtue of the bending joint between the first and second receptacle section, a flexible adjustment and the assumption of various angular positions are enabled, in order to rigidly position two adjacent wall elements in relation to each other and to releasably connect them to each other. Such plug connection elements may also be used for the construction of shelves, storage areas or similar.

The bending joint is preferably provided between two adjacent inner or outer legs of the first or second receptacle. If the bending joint is formed between two outer legs of the first and second U-shaped receptacle then a stable outer corner can be created. The inner legs, which are in alignment towards each other, of the first and second receptacle are formed separately from each other and, in particular, shortened, so that during transition of the plug connection element from a starting position, in which for example the first and second receptacle are aligned with an angle of 180° or in true alignment, into a 90° corner arrangement, the inner legs can be swivelled towards each other and do not obstruct the swivelling motion. The same applies analogously to an interchanged arrangement.

In a preferred embodiment of the plug connection element, the adjacent inner or outer legs of the first and second receptacle and the bending joint are formed from a common wall element. As a result, the bending joint and adjacent inner or outer legs are formed in one piece, as a result of which simplified manufacturing is made possible. In addition, the bending joint, which also forms a folding section between the adjacent inner or outer legs, can extend over the entire height or only a portion thereof.

The bending joint of the plug connection element is preferably formed by one or a plurality of cutouts aligned in a line, which cutouts preferably extend perpendicular to the base plate of the first and second receptacle, and therefore forms a bending line between the adjacent inner or outer legs. This facilitates simple manufacturing.

Furthermore, at least one fixing pin is preferably formed on the base plate, which fixing pin protrudes transversely to the direction of extension of the U-shaped receptacle into the U-shaped receptacle and is preferably formed in a wedge shape. As a result, it can be made possible to easily drive the fixing pin into an end face of a wall element and therefore pre-fix the wall element to the plug connection element. In particular, this fixing can be performed by hand and, if necessary, with assistance from one or two hammer blows. On the fixing pin a longitudinal bead is preferably provided for stiffening of the fixing pin.

The fixing pins are preferably each provided at the outer end on each base plate of the plug connection element. This makes reliable gripping possible even with damaged corners of the wall elements.

In addition, preferably at least one horizontal block is arranged on the base plate, which horizontal block extends transversely to the direction of extension of the U-shaped receptacle. This horizontal block is advantageously arranged at a distance to the fixing pin and has, in particular, a lesser immersion depth than the fixing pin. The horizontal block can be formed as a bent-over tab. As a result, additional stability and load-bearing capacity can be achieved by means of the additional clawing of the horizontal block into the edge region of the wall element, said edge region being arranged in the U-shaped receptacle.

In a further preferred embodiment, the plug connection element has on the base plate a stop ridge, which extends in the opposite direction to the outer leg of the U-shaped receptacle. These stop ridges engage onto an outer side of the pallet floor or onto the cover of a transportation box, thus fixing on the one hand a circumferential container wall formed of a plurality of wall elements to the floor of the transportation box and enabling, on the other hand, a securely located mounting for the lid. Preferably the stop ridges are formed having a reinforcing bead at their longitudinal extension. As a result of this, the load-bearing capacity of such a transportation box assembled with such plug connection elements can, in turn, be increased.

Furthermore, at least one fastening bore can preferably be provided on the inner leg, outer leg, base plate and/or stop ridge. As a result, nails or bolts can be used additionally for fixing of the plug connection element to the one or plurality of wall elements. Preferably one fastening bore each is provided on the inner and outer leg, with said fastening bores being in alignment towards each other, so that additional bolting of the plug connection element to the wall element is enabled.

In a further preferred embodiment of the plug connection element, the first and second receptacle and the bending joint consist of a plate-shaped material and are preferably manufactured as a stamped-bent part or as a laser-bent part. This enables a plug connection element to be formed in a cost-effective manner as a one-piece element. Preferably the plug connection element is made of a sheet metal, in particular galvanized sheet metal.

In a further advantageous embodiment of the plug connection element, there is a fold at the free ends of the inner legs or outer legs of the first and second U-shaped receptacle, which extends to the outside in relation to the U-shaped receptacle. This enables simplified placement of the plug connection element onto the end faces of the wall elements. Furthermore, the fold enables, by means of a light hammer tap onto it, the release of the plug connection element from the wall element. In addition, these folds offer the advantage that they reinforce the inner and outer legs of the plug connection element.

The first and second receptacles of the plug connection element are preferably aligned in a starting position in alignment towards each other. This means that the first and second receptacles are positioned in a row behind each other and are connected to each other by means of the bending joint. Such a starting position simplifies the production of the plug connection element and reduces waste material, and also makes it possible for the plug connection element to assume various angular positions up to a 90° corner from this starting position.

Interlocking elements are preferably provided at the end regions aligned towards each other of the first and second base plate, wherein said interlocking elements interlockingly engage in each other during the transition of the first and second receptacles into an angular position, in particular an angular position of 90°. The interlocking elements can take the form of a cutout and a tab that engage into each other.

In a further preferred embodiment of the plug connection element, on an outer side of the first or second U-shaped receptacle, in particular on the base plate, a U-shaped profile section is provided, which is preferably arranged in relation to the insertion direction of a wall element separately by 90° to the first or second U-shaped receptacle. Here, it is preferably provided that an inner or outer leg of the U-shaped profile section is fastened onto the base plate. Preferably this U-shaped profile section is supported at one back against the stop ridge. This arrangement advantageously offers higher stiffness. This plug connection element can enable a fastening option on pallets on which no screw or nail connections are possible. Preferably the U-shaped profile section has internally-located barbs that act counter to the push-on direction.

The object of the present invention is further solved via a transportation box with a pallet floor having a plurality of wall elements and a lid, in which a plug connection element in accordance with one of the embodiments described above is positioned and fixed at the upper and lower corner regions of two adjacent wall elements. By virtue of the clamping arrangement of the plug connection element on account of the inner and outer legs on the wall elements and also due to the driving-in of the fixing pin into the end face of the wall element, a transportation box can be created that can be assembled and disassembled again without tools or almost without tools, wherein all parts of the packaging are reusable. This applies both to the plug connection elements and to the pallet floors, the wall elements and the lid. In addition, the set-up time can be significantly shortened. Furthermore, a reduction of the manufacturing costs is made possible by virtue of the fact that standard commercially available panel materials can be used for the wall elements. Additional machining of the wall elements, for example by means of milled, drilled or grooved profiles, can be omitted.

At least the wall elements of the transportation box are preferably manufactured from wood, compressed wood, paperboard or plastic panels, in particular hollow-chamber profiles or foamed plastic panels. As a result, it is possible to use cost-effective materials for the container walls. Preferably the transportation box is formed from a uniform material, such as wood, which then further enables unmixed recycling.

Figure 5:
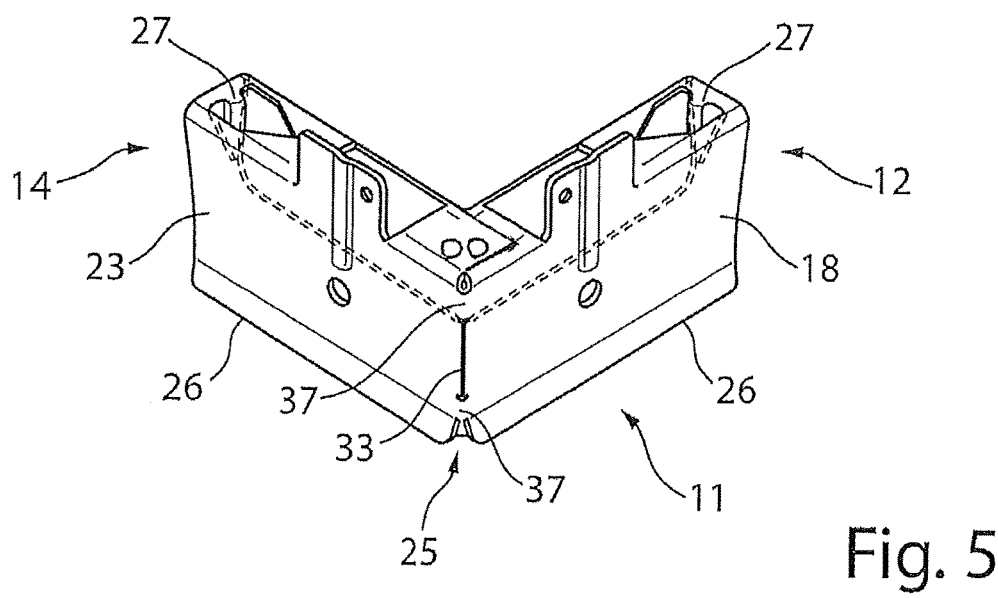
Figure 6:
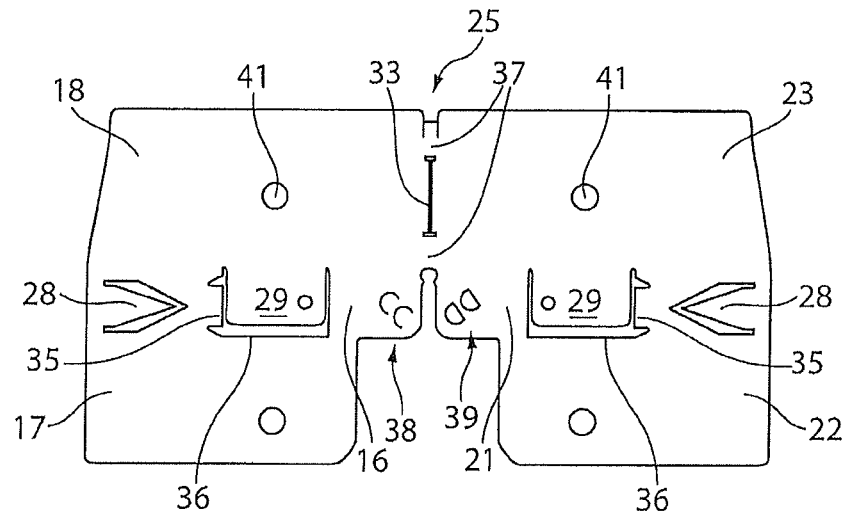
Figure 7:
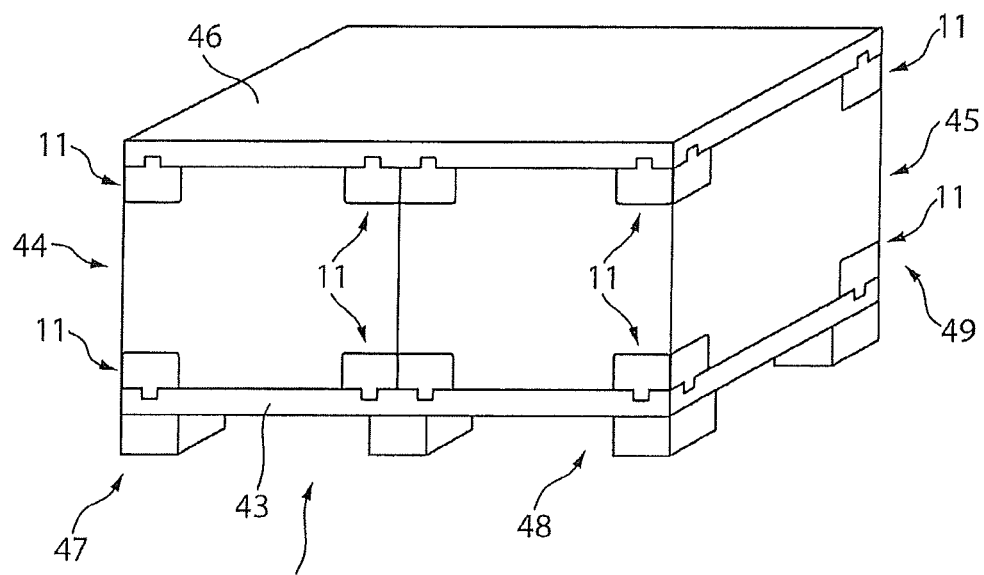
Figure 8:
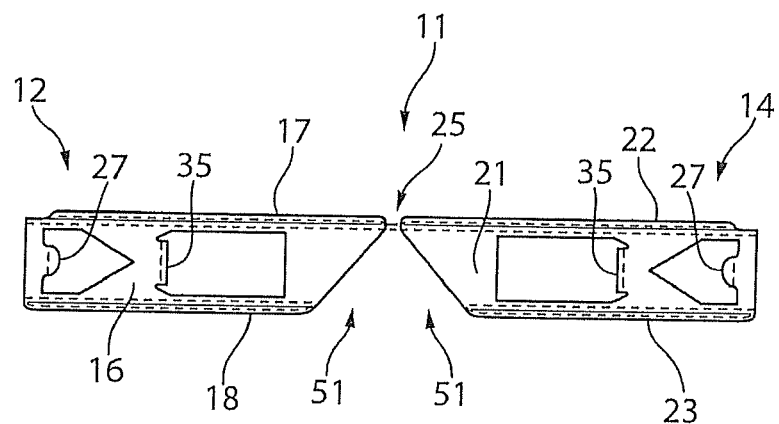
Figure 9:
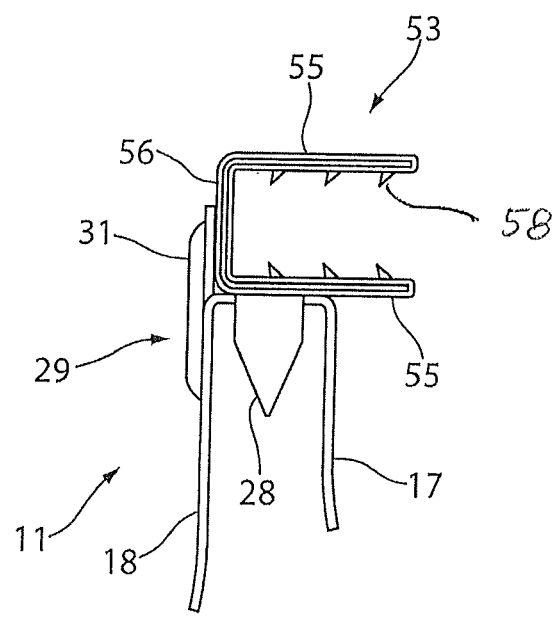

The present invention and further advantageous embodiments and developments will be described and explained in further detail below with the aid of the examples depicted in the drawings. The features portrayed in the description and drawings can be applied according to the present invention individually or in an arbitrary combination of a plurality of features. In the drawing:

FIG. 1 shows a first perspective view of an inventive plug connection element,

FIG. 2 shows a further perspective view of the plug connection element according to FIG. 1, FIG. 3 shows a schematic view from above onto the plug connection element according to FIG. 1, FIG. 4 shows a perspective view of the plug connection element according to FIG. 1 in a 90° corner arrangement, FIG. 5 shows a further perspective view of the plug connection element according to FIG. 4, FIG. 6 shows a schematic view of a plate-shaped material prior to a bending process in an end format according to FIG. 1, FIG. 7 shows a perspective view of a transportation box with plug connection elements according to FIGS. 1 and 4, FIG. 8 shows a schematic view of an alternative embodiment of the plug connection element according to FIG. 1 and FIG. 9 shows a schematic side view of a further alternative embodiment of the plug connection element according to FIG. 1.

FIG. 1 shows a perspective view onto an outer side of a plug connection element 11, and FIG. 2 shows a perspective view onto an inner side of a plug connection element 11. FIG. 3 shows a view from above onto the plug connection element 11 according to FIG. 1.

This plug connection element 11 comprises a first receptacle 12 and a second receptacle 14, which are U-shaped. In this regard the first receptacle 12 has a first base plate 16, to which an inner leg 17 and an outer leg 18 adjoin at an angle and which form the first U-shaped receptacle 12. The second receptacle 14 is formed analogously and comprises a second base plate 21 and an inner leg 22 and outer leg 23 at an angle to it, by means of which the second U-shaped receptacle is formed.

The first and second receptacles 12, 14 are connected to each other by means of a bending joint 25, wherein by virtue of this bending joint 25 the first and second receptacles 12, 14 are aligned in alignment towards each other or at an angle of 180°. The bending joint 25 is preferably provided on the outer leg 18 of the first receptacle 12 and on the outer leg 23 of the second receptacle 14, so that the first and second receptacles 12, 14 can be pivoted around an axis extending along the bending joint 25. As the base plates 16, 21 are horizontally aligned, the pivoting axis of the bending joint 25 is arranged perpendicular to this, so that the first and second receptacles 12, 14 are arranged pivotably mounted around a vertical axis. For example, an alignment of the first and two further receptacles 12, 14 is possible in a 90° arrangement as a corner connection, as is shown in FIGS. 4 and 5, which will be discussed in more detail below.

On the inner and/or outer leg 17, 18, 22, 23 of the first and/or second receptacle 12, 14, a fold 26 is preferably provided, which points outward in relation to the U-shaped receptacle 12, 14. As a result, easier setting-down of the plug connection element 11 onto a wall element for positioning in the first receptacle 12 or second receptacle 14 can be enabled. The inner leg 17 and outer leg 18 are preferably to be provided having a slight alignment towards each other in terms of their free ends, i.e. the distance between the inner leg 17 and outer leg 18 immediately before the incipient fold 16 is less than the width of the base plate 16, 21. As a result, after insertion of a wall element in the U-shaped receptacle 12, 14 a clamping force can be exerted by means of the inner and outer legs 17, 22; 18, 23 onto the wall element for pre-fixing.

The first and second base plates 16, 21 each have a fixing pin 28, which protrudes into the U-shaped receptacle 12, 14. This is preferably arranged in a wedge shape, wherein the tip of the latter protrudes into the U-shaped receptacle 12, 14 in order to enable easy fixing of the plug connection element 11 by means of penetration of the fixing pin 28 into the end face of the wall element. The fixing pins 28 are each arranged at the outer end of the first and second receptacle 12, 14, so that even if the corner regions of wall elements are damaged, a reliable and releasable connection between two adjacent wall elements by means of the plug connection element 11 is enabled. This fixing pin 28 can be formed in simple manner by means of bending over a portion of the base plate 16, 21. The fixing pin 28 preferably comprises a longitudinal bead 27, which extends in particular from the fold to the tip.

A stop ridge 29 extends in the plane of the outer leg 18, 23, with said stop ridge 29 extending in the opposite direction to the outer leg 18, 23 with respect to the base plate 16, 21. This stop ridge 29 serves for lateral fixing of the plug connection element 11 on a floor and/or for lateral fixing of a lid laid on the base plate of the connection element 11. Preferably the stop ridge 29 comprises a bead 31 for reinforcement of the former, which bead 31 preferably extends into the outer leg 18, 23.

As the stop ridge 29 forms a partial area of the base plate 16, 21 and is bent upward in relation to the latter, a cutout 36 is formed in the first and second base plate 16, 21. At the cutout 36 a horizontal block 35 is provided, which in turn protrudes into the U-shaped receptacle 12, 14. This is a fold for the formation of a tab, which should preferably be shorter than the fixing pin 28. This can also be formed in a wedge shape. A horizontally aligned end face is, however, also sufficient. This horizontal block 35 also engages, when the first and second base plate 16, 21 make full contact, on the end face of the wrapped-around wall element and prevents horizontal detachment of the plug connection element 11 from the wall element.

The bending joint 25 is preferably formed through one or a plurality of cutouts 33 or slots or open-edged slots, so that one or a plurality of bars 37 remain between the outer legs 18, 23, which enable in a simple manner a folding of the plug connection element 11.

The inner legs 17, 22 are formed shorter pointing in the direction towards the bending joint 25, so that a free space for assumption of a 90° position of the first receptacle 12 in relation to the second receptacle 14 is enabled, wherein in the 90° arrangement the adjacent end faces of the inner legs 17, 22 can abut against each or other lie in contact with each other, as is shown in FIG. 4.

In order to preserve this 90° arrangement according to FIGS. 4 and 5 of the plug connection element 11, it is possible to provide in the end regions of the first base plate 16 and second base plate 21, said end regions being aligned towards each other, interlocking elements 38, 39, which engage in each other after the transition of the first receptacle 12 and second receptacle 14 into the 90° corner arrangement and secure this position. For example, the interlocking element 38 can be formed as a tab or hook element and the interlocking element 39 as a cutout or breakthrough, which then engage interlockingly into each other.

For additional fastening and securing of the plug connection element 11 on the wall elements, through bores 41 can be provided, which enable the insertion of nails or bolts. These through bores can be provided on the inner legs 17, 22 and/or outer legs 18, 23, the base plates 16, 21 and/or the stop ridges 29.

FIG. 6 shows a schematic view of a work step for production of the plug connection element 11 as a stamped-bent part or laser-bent part. Preferably this plug connection element 11 is manufactured in a plurality of punching, laser cutting or bending steps. Preferably a plate-shaped raw material, in particular a sheet metal panel, is cut out or laser-cut in the form shown in FIG. 6. It can be seen here that the bending joint 25 or the bars 37 between the wall sections are already formed for formation of the first and second receptacle 12, 14. The fixing pins 28, the stop ridges 29 and the horizontal block 35 are already punched out for formation of the first and second receptacle 12, 14. Likewise, the interlocking elements 38, 39 are also punched out. Afterwards a bending process takes place in order to form the U-shaped first and second receptacle 12, 14 and the fold 26 as well as to form the fixing pin 12 and the horizontal block 35 facing inwards and the stop ridge 29 facing outwards in relation to the base plate 16, 21.

FIG. 7 shows a perspective view of a transportation box 42. This transportation box 42 comprises a pallet floor 43, a plurality of wall elements 44, 45 and a lid 46, which are releasably and rigidly connected to each other by means of plug connection elements 11. The plug connection elements are formed as corner connectors according to FIGS. 4 and 5. For construction of the transportation box 42, one respective plug connection element 11 is, for example, applied in two lower corner regions 47, 48 of the wall element 44, and then the wall element 45 is positioned in the corner region 48. The plug connection element 11 is likewise attached in the further corner region 49 of the wall element 45, so that subsequently two wall elements 44, 45 arranged at 90° to each other can be set up on the pallet floor 43. After the positioning of wall elements 44, 45 in relation to each other, it is possible to already apply a plug connection element 11 in the upper corner region for secure arrangement of the two wall elements 44, 45 in relation to each other. After this, loading of the transportation box 42 can be performed if this has not already been done previously. Afterwards the further wall elements are attached following an analogous procedure in order to form a closed container wall for the transportation box 42. After this, the upper plug connection elements can be attached. Then the lid 46 is laid in place, wherein the latter is held in position by means of the stop ridge 29. After this, the pallet floor, the wall elements 44, 45, and the lid 46 can be fixed in relation to each other by means of straps. Alternatively nails or bolts can also be used to fasten them.

If a wall element 44, 45 is formed of two panel halves, these can be aligned and positioned in alignment towards each other by means of the plug connection element as a longitudinal connection element according to FIGS. 1 and 2. The above explanations apply analogously here.

The transportation box 42 consists preferably of wood, compressed wood, paperboard, plastic or equivalent. Alternatively the wall elements can consist of wood, compressed wood or paperboard and the lid of plastic.

FIG. 8 shows a schematic view from above onto an alternative embodiment of the plug connection element 11 according to FIGS. 1 to 5. In this embodiment, a cut-out 51 is provided instead of the interlocking elements 38, 39. This is preferably formed as a bevel of 45° on the inner leg. This enables the two U-shaped receptacles 12 and 14 to be angled at an angle of 90° to each other, as is shown in FIGS. 4 and 5, so that the bevels of the cut-outs 51 lie adjacent to each other.

FIG. 9 shows a schematic side view of a further alternative embodiment of the plug connection element 11. On this plug connection element 11 it is provided that a U-shaped profile section 53 is arranged on one of the two receptacles 12, 14. This U-shaped profile section 53 has two parallel legs 55, wherein one of the two legs 55 makes contact on the base plate 16. A connection section 56 between the two legs 55 is preferably located on the stop ridge 29. This U-shaped profile section 53 extends preferably along the length of an inner leg 17, 22, the receptacle 12, 14, or is formed shorter in relation to this. Barbs 58 are provided pointing into the receptacle region of the U-shaped profile section 53. This U-shaped profile section 53 can be connected by means of an adhesive, clamping, punched and/or welded connection to the first or second receptacle 12, 14.

By means of such a plug connection element 11 it is enabled that the latter is, for example, attached by means of the U-shaped profile section 53 to the edge region of the pallet floor 43, so that the plug connection element 11 can assume a position as shown in FIG. 7. This can be provided in particular on pallet floors 43 on which the feet are not arranged flush with the corner region but instead have an inward offset in relation to the corner range or are laterally offset to the corner region. After the U-shaped profile section 53 has been attached, wall elements can be attached in turn to the plug connection element in the first and second receptacle 12, 14 and fixed. This embodiment of the plug connection element 11 provides the option of fastening to pallets or pallet floors on which no screw or nail connections are possible or desired.

The invention claimed is:

1. A plug connection element for releasably connecting two adjacent first and second wall elements of a transportation box, having a first U-shaped receptacle for an edge region of the first wall element, which is formed from a first base plate and an inner leg angled to the first base plate and an adjoined outer leg angled to the first base plate, and a second U-shaped receptacle for an edge region of the second wall element, which is formed from a second base plate and an inner leg angled to the second base plate and an adjoined outer leg angled to the second base plate, wherein the first and second U-shaped receptacles are longitudinally aligned, and wherein the first and second receptacle are connected to each other by a bending joint extending perpendicular to the first and second base plates, so that the U-shaped receptacles are adjustable in terms of their angular position to each other, and wherein the bending joint includes at least one cutout extending perpendicular to the first and second base plates.

2. The plug connection element according to claim 1, wherein the bending joint is provided between two adjacent inner legs or outer legs of the first U-shaped receptacle and second U-shaped receptacle.

3. The plug connection element according to claim 1, wherein the adjacent inner legs or outer legs of the first and second U-shaped receptacle and the bending joint form a common wall element.

4. The plug connection element according to claim 1, wherein at least one of the first and second receptacles has a stop ridge, which extends in the opposite direction to the outer leg with respect to the base plate of the respective receptacle.

5. The plug connection according to claim 4, wherein the stop ridge has a reinforcement bead.

6. The plug connection element according to claim 4, wherein on at least one inner leg, outer leg, the base plate and/or the stop ridge of said one of the first and second receptacles, at least one fastening bore is provided.

7. The plug connection element according to claim 1, wherein the first and second receptacles and the bending joint consist of a plate-shaped material.

8. The plug connection element according to claim 1, wherein the first and second receptacles are manufactured as a stamped-bent part or as a laser-bent part.

9. The plug connection element according to claim 1, wherein at a free end of the inner leg and/or outer leg, a fold is provided, which points outward in relation to the U-shaped receptacle.

10. The plug connection element according to claim 1, wherein the first and second receptacle are aligned in alignment towards each other.

11. The plug connection element according to claim 1, wherein at end regions facing each other of the first and second base plate, cutouts are provided or interlocking elements are provided, which, during the transition of the first and second receptacle into an angular position, interlockingly engage with each other.

12. The plug connection element according to claim 1, wherein on one outer side of the first or second U-shaped receptacles, a U-shaped profile section is arranged.

13. The plug connection element according to claim 12, wherein the U-shaped profile section is fastened to the base plate of the respective receptacle.

14. A plug connection element for releasably connecting two adjacent first and second wall elements of a transportation box, having a first U-shaped receptacle for an edge region of the first wall element, which is formed from a first base plate and an inner lea angled to the first base plate and an adjoined outer leg angled to the first base plate, and a second U-shaped receptacle for an edge region of the second wall element, which is formed from a second base plate and an inner leg angled to the second base plate and an adjoined outer leg angled to the second base plate, wherein the first and second U-shaped receptacles are longitudinally aligned, and wherein the first and second receptacle are connected to each other by a bending joint, so that the U-shaped receptacles are adjustable in terms of their angular position to each other, wherein on at least one of the first and second base plates, at least one fixing pin is formed that protrudes transversely to the longitudinal extent of the respective U-shaped receptacle and into the U-shaped receptacle.

15. The plug connection element according to claim 14, wherein the fixing pin has a wedge shape.

16. The plug connection element according to claim 14, wherein the first and second base plates each have at an outer edge thereof a fixing pin that protrudes transversely to the direction of extension of the respective U-Shaped receptacle.

17. The plug connection element according to claim 14, wherein said one of the first and second base plates has a horizontal block that extends transversely to the direction of extension of the U-shaped receptacle and has a lesser immersion depth than the fixing pin.

18. The plug connection element according to claim 14, wherein the fixing pin has a longitudinal bead.

19. A transportation box having a pallet floor, with a plurality of wall elements and a lid, wherein the wall elements are aligned perpendicular to the pallet floor and lid, wherein at upper and lower corner regions of adjacent first and second wall elements, a plug connection element connects the first and second wall elements, wherein the plug connection element comprises a first U-shaped receptacle for-receiving an edge region of the first wall element, which U-shaped receptacle is formed from a first base plate and an inner leg angled to the first base plate and an adjoined outer leg angled to the first base plate, and a second U-shaped receptacle receiving an edge region of the second wall element, which is formed from a second base plate and an inner leg angled to the second base plate and an adjoined outer leg angled to the first base plate, wherein the first and second U-shaped receptacles are connected to each other by a bending joint, so that the U-shaped receptacles are adjustable in terms of their angular position to each other, and wherein the first and second base plates each have a fixing pin penetrating into the edge region of the respective wall element.

20. The transportation box according to claim 19, wherein at least the wall elements are manufactured from wood, compressed wood, paperboard or plastic.

\* \* \* \* \*